US012634699B2

(12) United States Patent
Sun et al.

(10) Patent No.: US 12,634,699 B2
(45) Date of Patent: May 19, 2026

(54) GROUP ADDRESS FRAMES REPLAY PROTECTION IN MULTI-LINK AND OTHER IMPROVEMENTS TO MULTI-LINK SYSTEM

(71) Applicants: SONY GROUP CORPORATION, Tokyo (JP); SONY CORPORATION OF AMERICA, New York, NY (US)

(72) Inventors: Li-Hsiang Sun, San Jose, CA (US); Liangxiao Xin, Santa Clara, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 420 days.

(21) Appl. No.: 18/206,680

(22) Filed: Jun. 7, 2023

(65) Prior Publication Data

US 2024/0007860 A1 Jan. 4, 2024

Related U.S. Application Data

(60) Provisional application No. 63/367,410, filed on Jun. 30, 2022.

(51) Int. Cl.
| | |
|---|---|
| *H04W 12/122* | (2021.01) |
| *H04W 12/76* | (2021.01) |
| *H04W 74/08* | (2024.01) |
| *H04W 74/0816* | (2024.01) |
| *H04W 88/10* | (2009.01) |

(52) U.S. Cl.
CPC ......... *H04W 12/122* (2021.01); *H04W 12/76* (2021.01); *H04W 74/0816* (2013.01); *H04W 88/10* (2013.01)

(58) Field of Classification Search
CPC .............. H04W 12/122; H04W 12/76; H04W 74/0816; H04W 88/10; H04W 88/08; H04L 63/1416; H04L 63/1466
See application file for complete search history.

(56) References Cited

U.S. PATENT DOCUMENTS

| | | | | |
|---|---|---|---|---|
| 12,212,970 B2 * | 1/2025 | Huang | .................. | H04W 12/55 |
| 2020/0267541 A1 | 8/2020 | Huang | | |
| 2021/0050999 A1 * | 2/2021 | Huang | .................... | H04L 9/088 |
| 2021/0282007 A1 * | 9/2021 | Ho | ......................... | H04W 12/03 |

(Continued)

FOREIGN PATENT DOCUMENTS

| | | |
|---|---|---|
| WO | WO-2019227869 A1 | 12/2019 |
| WO | WO-2021141529 A1 | 7/2021 |

*Primary Examiner* — Liton Miah
(74) *Attorney, Agent, or Firm* — O'BANION & RITCHEY LLP; John P. O'Banion

(57) ABSTRACT

Enhanced wireless protocols are described for stations (STAs) which are associated with Multiple-Link Devices (MLD). One embodiment describes overcoming replay attacks (with or without a modified Sequence Number (SN) even when protected by a Group Temporal Key (GTK) or similar. Other embodiments describe MLP operating enhancements associated with utilizing a Robust Security Network Element (RSNE), or NSTR Mobile AP MLD, or Target Beacon Transmission Time (TBTT) Information fields with Reduced Neighbor Reports (RNR), or Quiet Channel elements in an Association/Reassociation, or that use PPDU end alignment are all subject to specific shortcomings when applied to MLDs.

22 Claims, 12 Drawing Sheets

(56)  References Cited

U.S. PATENT DOCUMENTS

| | | | | |
|---|---|---|---|---|
| 2021/0282047 A1* | 9/2021 | Cherian | ................ | H04W 80/02 |
| 2021/0377851 A1* | 12/2021 | Liu | ................... | H04W 28/0263 |
| 2021/0392494 A1* | 12/2021 | Huang | ................. | H04W 12/76 |
| 2022/0182184 A1* | 6/2022 | Wang | ................... | H04L 1/1621 |
| 2024/0031147 A1* | 1/2024 | Huang | ................ | H04W 12/106 |
| 2025/0358610 A1* | 11/2025 | Ho | ..................... | H04W 12/041 |

* cited by examiner

Aggregation and Authentication Data (AAD)

| FC | A1 | A2 | A3 | SC | A4 | QC |
|----|----|----|----|----|----|----|

Octets: 2 6 6 6 2 6 2

RSNE format

| Element ID | Length | Version | Group Data Cipher Suite | Pairwise Cipher Suite Count | Pairwise Cipher Suite List |
|---|---|---|---|---|---|
| Octets: 1 | 1 | 2 | 0 or 4 | 0 or 2 | 0 or (4 x m) |

| AKM Suite Count | AKM Suite List | RSN Capabilities | PMKID Count | PMKID List | Group Management Cipher Suite |
|---|---|---|---|---|---|
| Octets: 0 or 2 | 0 or (4 x n) | 0 or 2 | 0 or 2 | 0 or (16 x s) | 0 or 4 |

FIG. 8

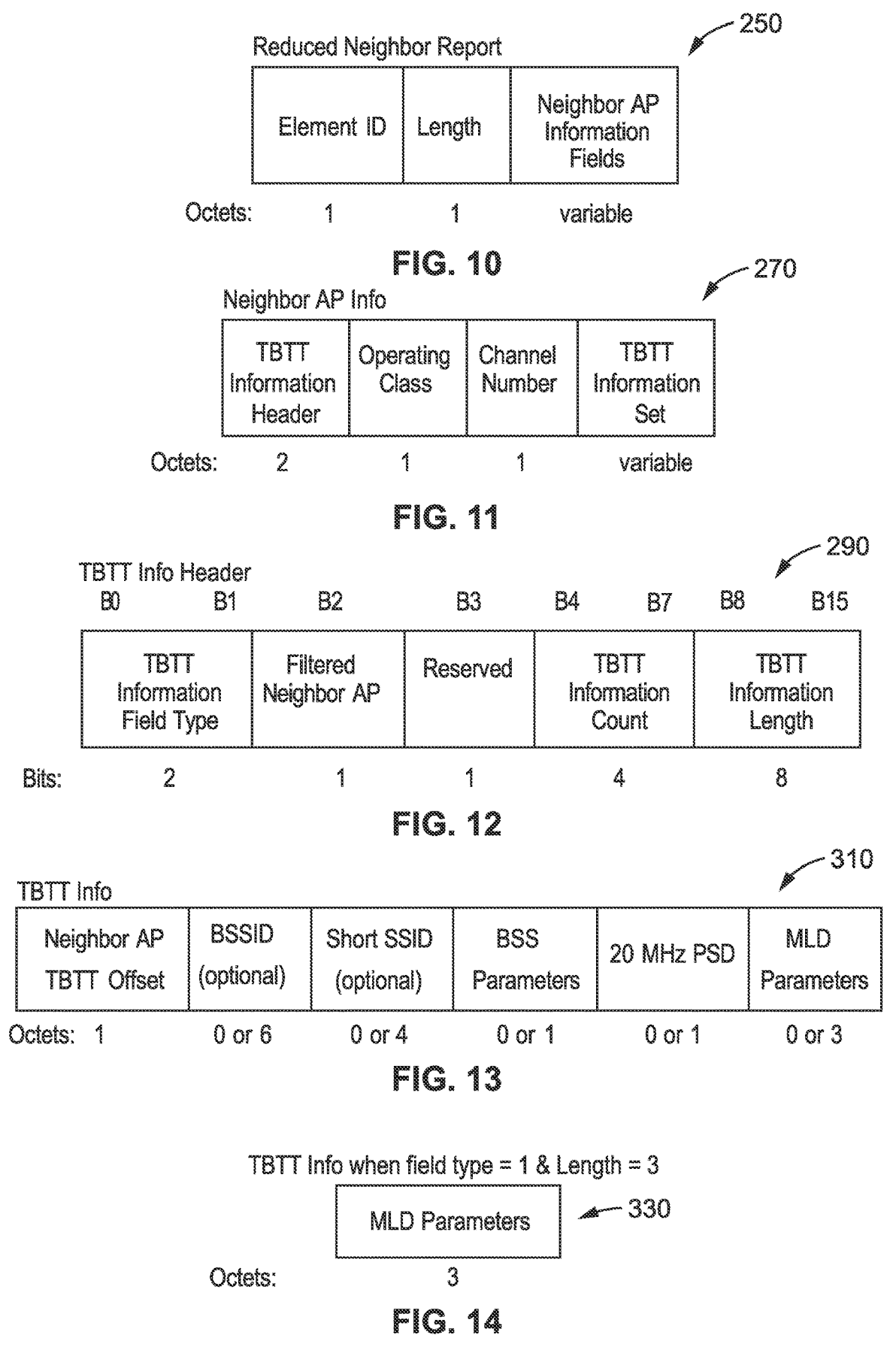

Reduced Neighbor Report

250

| Element ID | Length | Neighbor AP Information Fields |
|---|---|---|

Octets:    1    1    variable

Neighbor AP Info

| TBTT Information Header | Operating Class | Channel Number | TBTT Information Set |
|---|---|---|---|

Octets:    2    1    1    variable

TBTT Info Header

B0    B1    B2    B3    B4    B7    B8    B15

| TBTT Information Field Type | Filtered Neighbor AP | Reserved | TBTT Information Count | TBTT Information Length |
|---|---|---|---|---|

Bits:    2    1    1    4    8

TBTT Info

| Neighbor AP TBTT Offset | BSSID (optional) | Short SSID (optional) | BSS Parameters | 20 MHz PSD | MLD Parameters |
|---|---|---|---|---|---|

Octets:    1    0 or 6    0 or 4    0 or 1    0 or 1    0 or 3

FIG. 13

TBTT Info when field type = 1 & Length = 3

| MLD Parameters |
|---|

330

Octets:    3

FIG. 14

GROUP ADDRESS FRAMES REPLAY PROTECTION IN MULTI-LINK AND OTHER IMPROVEMENTS TO MULTI-LINK SYSTEM

CROSS-REFERENCE TO RELATED APPLICATIONS

This application claims priority to, and the benefit of, U.S. provisional patent application Ser. No. 63/367,410 filed on Jun. 30, 2022, incorporated herein by reference in its entirety.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless network communication using multiple-link devices, and more particularly to group address frame replay protection, and other MLD enhancements.

2. Background Discussion

Current wireless protocols for in use on stations (STAs) which are associated with Multiple-Link Devices (MLD) are subject to replay attacks (with or without a modified Sequence Number (SN)) even when protected by a Group Temporal Key (GTK) or similar.

In addition, protocols utilizing a Robust Security Network Element (RSNE), or NSTR Mobile AP MLD, or Target Beacon Transmission Time (TBTT) Information fields with Reduced Neighbor Reports (RNR), or Quiet Channel elements in an Association/Reassociation request, or that use PPDU end alignment; each being subject to specific shortcomings when applied to MLDs.

Accordingly, a need exists for an enhanced wireless apparatus protocols for MLD operations. The present disclosure fulfills that need and provides additional benefits over existing systems.

BRIEF SUMMARY

An Access Point (AP) Multiple-Link Device (MLD) has multiple affiliated APs operating over multiple links. A non-AP MLD has multiple affiliated non-AP STAs operating over multiple links. The non-AP MLD is associated with the AP MLD on multiple links. The non-AP MLD may monitor a link A and be in a dozing state on another link B. The non-AP MLD may switch to monitor link B and be in dozing state on another link A. When a non-AP MLD is monitoring a specific link, it may update the replay counters associated with that specific link Beacon Integrity Group Temporal Key (BIGTK), or Integrity Group Temporal Key (IGTK), or Group Temporal Key (GTK) based on the received group addressed/broadcast frames on that specific link. When a non-AP MLD is in dozing state on a specific link, it may not receive group addressed/broadcast frames on that specific link. The AP MLD, however, is always in an awake state on link A and link B.

The AP MLD that recently sent a group addressed/broadcast frame on link B, or to be sent on link B, may send a signaling message on link B or another link A, which includes a packet identifier or a portion of a packet identifier of the group addressed/broadcast frame on link B. When the non-AP MLD that previously operated on one link B switches to operate on another link A, it uses the signaling message to identify the group addressed/broadcast frames sent over link B and to update PN for group addressed/broadcast frames or IPN/BIPN for the group addressed/broadcast management frames sent over link A during which it may be in doze state, to avoid replay attack over link A.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 1 is an aggregation and authentication data (AAD) for protocol version 0 (PVO) of a group addressed data MAC Protocol Data Unit (MPDU).

FIG. 8 is a data field diagram of a Robust Security Network Element (RSNE) format, utilized according to at least one embodiment of the present disclosure.

FIG. 10 through FIG. 14 are data field diagrams of data fields relating to Target Beacon Transmission Time (TBTT) information, according to at least one embodiment of the present disclosure.

DETAILED DESCRIPTION

1. Introduction

A non-AP MLD may monitor a first link (link A) and be in doze (dozing) state on another link (link B), with links A and B being setup/associated links within an AP MLD. The non-AP MLD may update the replay counters associated with link A Beacon Integrity Group Temporal Key (BIGTK), or Integrity Group Temporal Key (IGTK), or Group Temporal Key (GTK) based on the received group addressed or broadcast frames on link A regularly. However, the replay counters associated with link B BIGTK/IGTK/GTK are not updated.

The non-AP MLD may decide to switch to monitor link B for group addressed/broadcast frames. After switching and receiving a group addressed frame, the non-AP MLD may not be able to determine the freshness of the frame (i.e. whether it is a replayed frame) because it has not updated its replay counters associated with BIGTK/IGTK/GTK for link B.

In IEEE P802.11-REVme/D1.2, April 2022, Section 12.5.3.5 it is stated: "*If the frame is not a GQMF, the transmitting STA shall insert a strictly increasing integer into the MME IPN/BIPN field*".

A GQMF is a Group-addressed Quality-of-service Management Frame. An MME is a Management Message Integrity Code (MIC) Element. IPN is short for IGTK Packet Number; while BIPN is short for BIGTK Packet Number.

The requirement above does not mandate a fixed/known increment. The non-AP MLD which is not monitoring a link may not have a reliable prediction with a fresh value of IPN/BIPN for a management frame with a known periodicity. It will be noted that the Timestamp field in a management frame does not prove the freshness of a frame as the timestamp field is not protected.

Figure 1:
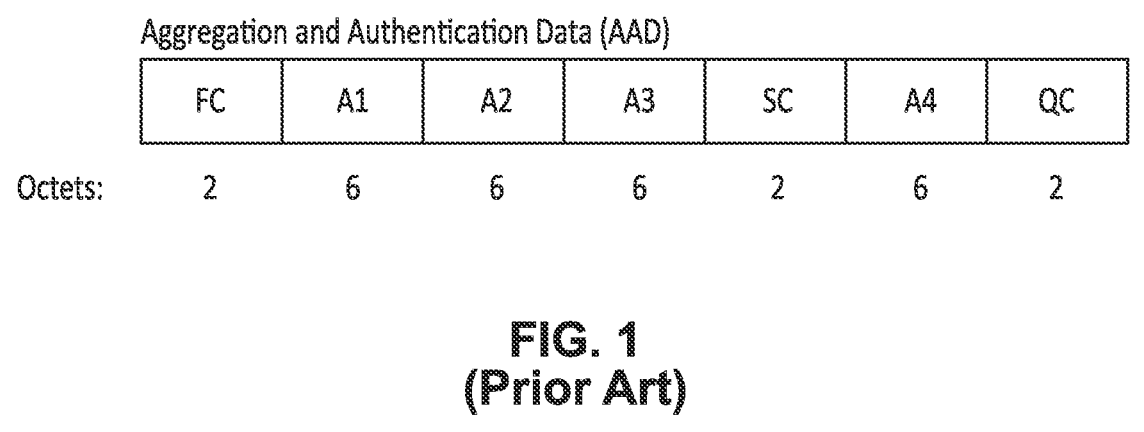

FIG. 1 depicts an Aggregation and Authentication Data (AAD) for Protocol Version 0 (PV0) group addressed data MAC Protocol Data Unit (MPDU) as found in IEEE P802.11-REVme/D1.2, April 2022 Section 12.5.2.3.3 Construct AAD. The draft describes the Sequence Control (SC) field as follows: "SC—MPDU Sequence Control field, with the Sequence Number subfield (bits 4-15 of the Sequence Control field) masked to 0, The Fragment Number subfield is not modified."

2. Embodiments of the Present Disclosure

2.1. Communication Station (STA and MLD) Hardware

Figure 2:
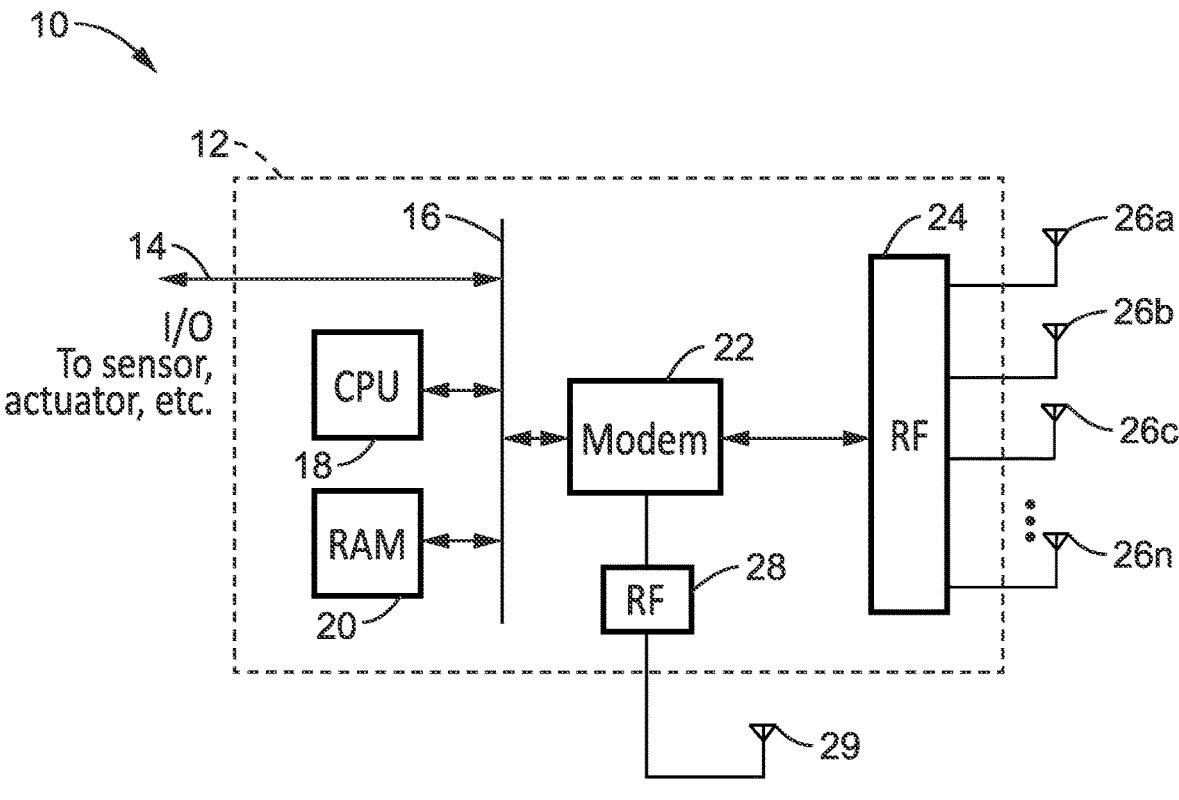
FIG. 2 is a block diagram of station (STA) hardware according to at least one embodiment of the present disclosure.

FIG. 2 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implements the described communication protocol. The host machine accommodates at least one modem 22 to support communications coupled to at least one RF module 24, 28 each connected to one or multiple antennas 29, 26*a*, 26*b*, 26*c* through 26*n*. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with the other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware, such as shown in this figure, can be combined into a multi-link device (MLD), which typically will have a processor and memory for coordinating activity, although it should be appreciated that these resources may be shared as there is not always a need for a separate CPU and memory for each STA within the MLD.

Figure 3:
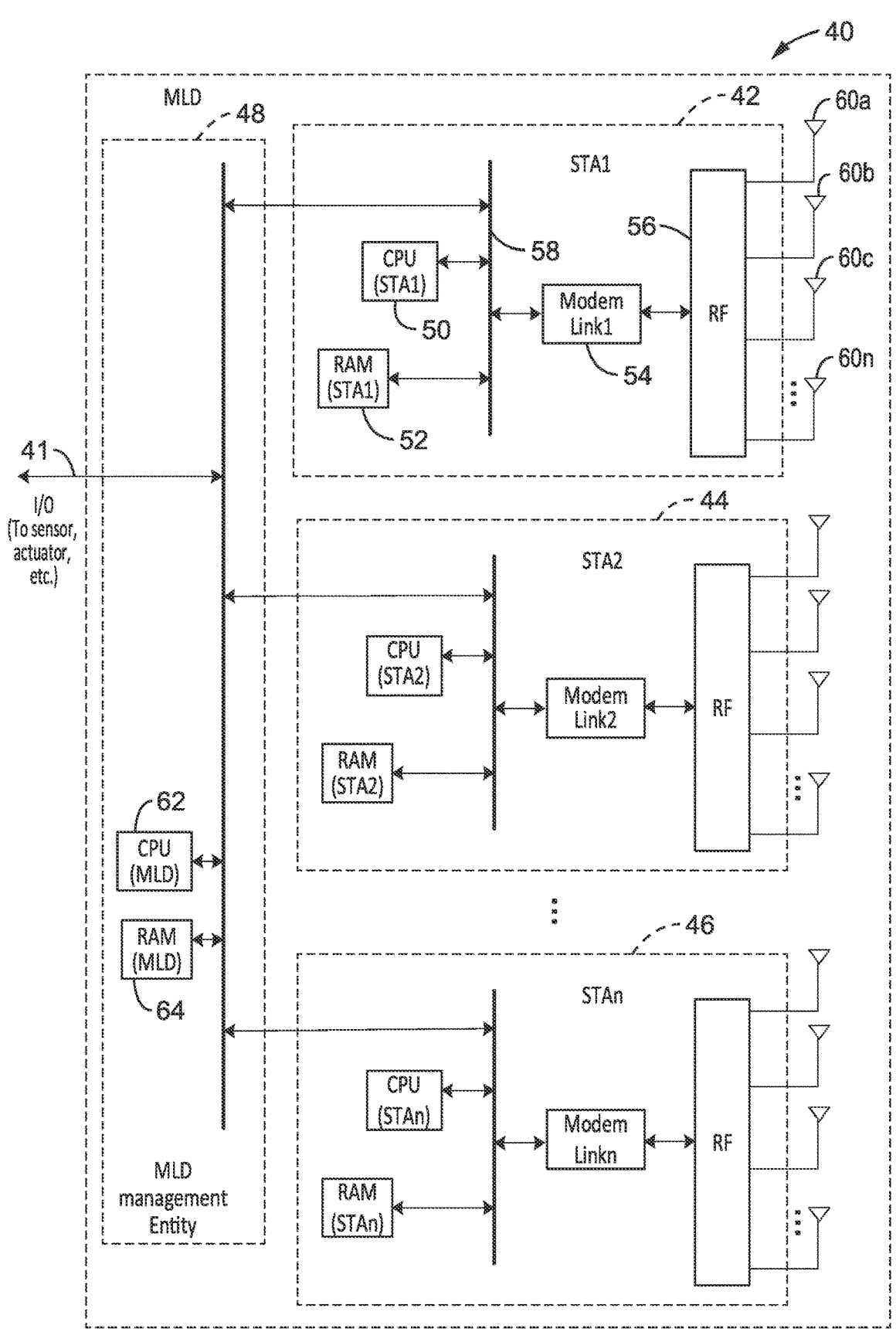
FIG. 3 is a block diagram of multiple-link device (MLD) hardware according to at least one embodiment of the present disclosure.

FIG. 3 illustrates an example embodiment 40 of a Multi-Link Device (MLD) hardware configuration. It should be noted that a "Soft AP MLD" is a MLD that consists of one or more affiliated STAs, which are operated as APs. A soft AP MLD should support multiple radio operations, for example on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implements communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

2. Operational Examples

2.1A. Issue 1A

In view of the requirements described above, it will be appreciated that a group addressed MPDU protected by GTK with a checked MIC may have a Sequence Control (SC) field modified by an attacker. Normally this kind of attack will not pass the replay detection (i.e., the attacker needs to replay an un-fresh (stale) Packet Number (PN). However, for a non-AP MLD just being awake on a link for which it has not monitored for a long time, it may not detect the stale (un-fresh) PN and the modified Sequence Number (SN) of the group addressed frame may be in the appropriate range compared to the group addressed frames received in its previously monitored link. The above describes what is referred to as a replay attack of a group addressed Data frame.

Figure 4:
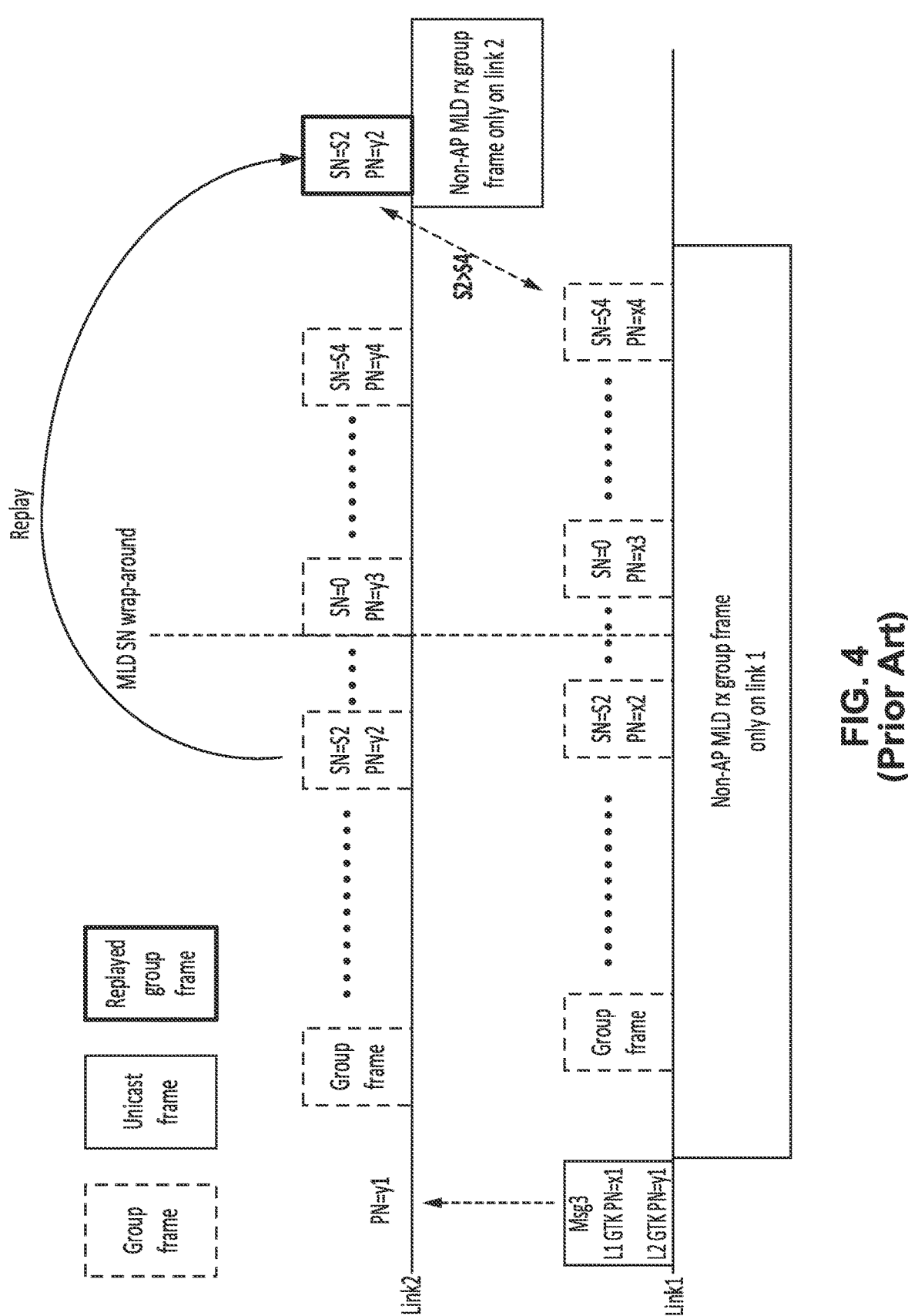
FIG. 4 is a communications diagram of a replay attack scenario showing a message sent on link 1, Group addressed frames on both links and a MLD SN wrap-around with the replay attack.

FIG. 4 depicts Example 1A of a replay attack scenario showing a message sent on link 1, Group frames on both links and a MLD SN wrap-around with the replay attack. In this example, the packet used in the replay attack is grabbed from link 2 and replayed on link 2. The example is based on the scenario that when a non-AP MLD may monitor a link A and be in dozing state on another link B. The non-AP MLD may update the replay counters associated with link A BIGTK/IGTK/GTK based on the received group addressed/broadcast frames on link A. However, the replay counters associated with link B BIGTK/IGTK/GTK are not updated.

During a four-way handshake, Multiple-Link Operation (MLO) Group Temporal Key (GTK) Key Data Encapsulation (KDE) for each link is included in message 3 (Msg3) as seen in the figure.

During the time as marked by block "Non-AP MLD rx group frame only" on link 1, the non-AP STA only monitors on link 1 and may be in doze state on link 2. Then, the non-AP MLD switches to monitoring only on link 2 for the duration as marked by the block "Non-AP MLD rx group frame only on link 2", during which the non-AP STA may be in doze state on link 1.

For a non-AP MLD which only monitors link 1 after association, upon switching to monitor link 2, it does not know the Packet Number (PN) for the group addressed data (PN space per link), but it has an ability to generally estimate the Sequence Number (SN) in regard to the SN space per MLD. It will be noted that SN space (12 bits) is smaller than PN space (48 bits). The PN between two links may not have a constant offset (there is no such requirement currently). The number of Groupcast with Retries (GCR) may be different on each link.

A replay attack may occur after a MLD SN wrap-around. A replay of a frame on link 2 before the MLD SN wrap-around, for example, with SN S2>S4, and PN y2>y1, is possible because SN wraps-around and the non-AP sees the replayed frame as being in an appropriate SN range of group addressed Data frames subsequent to what it has received on link 1.

2.1B. Issue 1B

Figure 5:
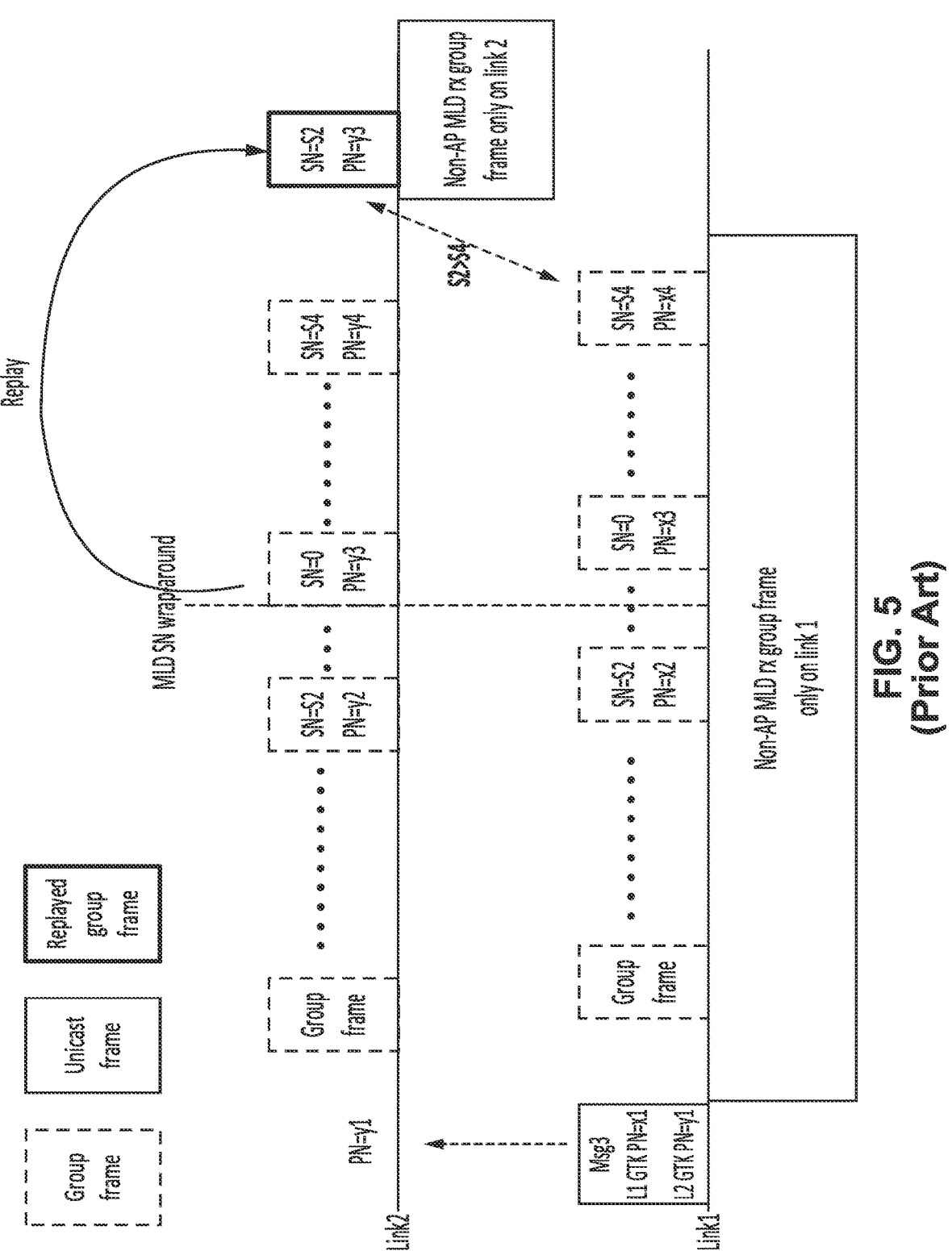
FIG. 5 is a communications diagram of a replay attack of a group addressed Data frame with a modified Sequence Number (SN).

FIG. 5 depicts an Example 1B of a replay attack of a group addressed Data frame with a modified SN. A replay is possible because SN is not protected by AAD, for example the replay attack on link 2 replays a previous packet on link 2 immediately after the MLD SN wrap-around event. The replayed frame was with SN=0 and PN=y3. The attacker modified the SN from 0 to S2 in the replayed packet. since modified SN S2>S4, PN y3>y1, the non-AP sees the replayed frame as in an appropriate SN range of group addressed Data frames subsequent to what it was received on link 1.

2.2. Solutions

Figure 6:
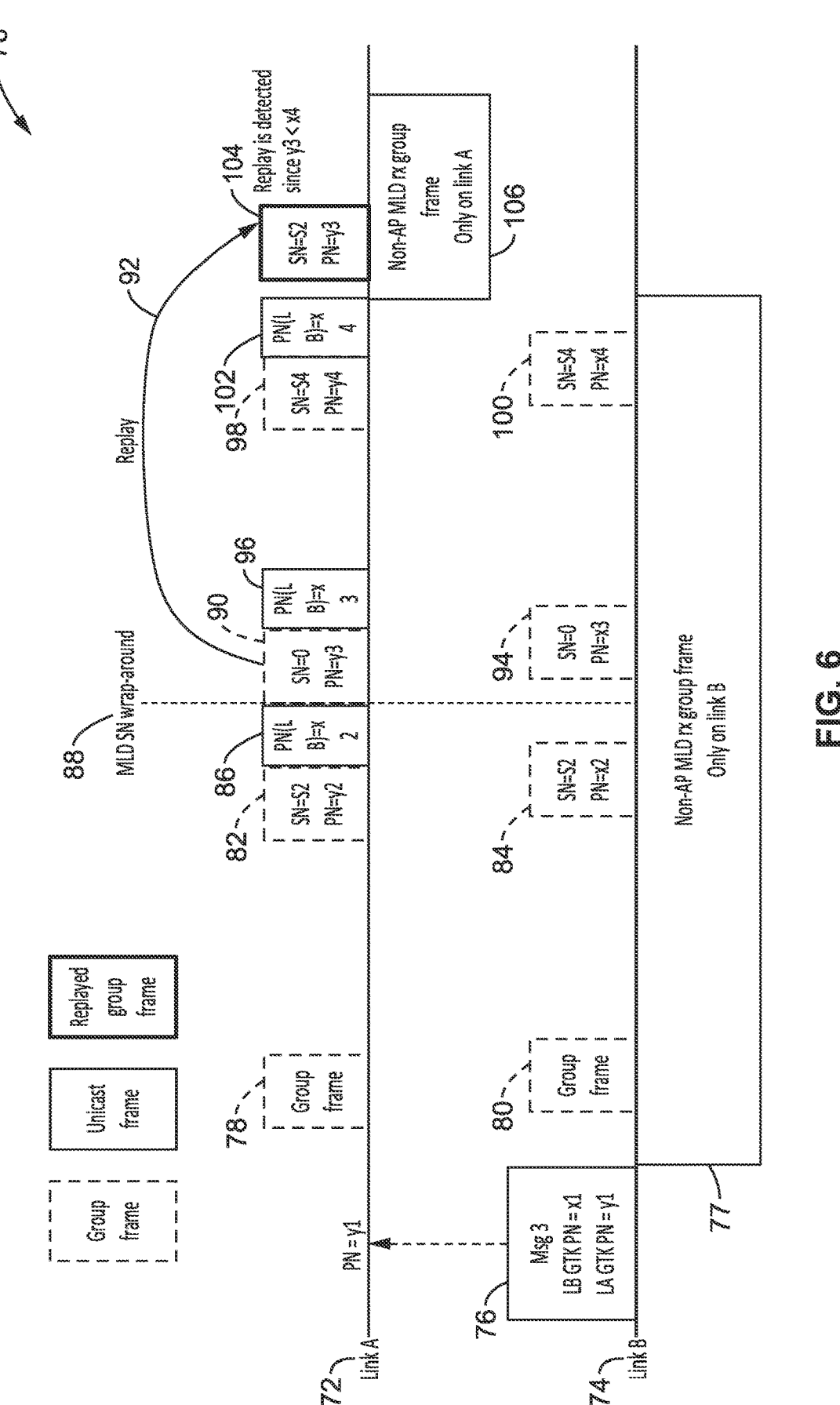
FIG. 6 is a communications diagram of overcoming the replay attack seen in FIG. 4, according to at least one embodiment of the present disclosure.
Figure 7:
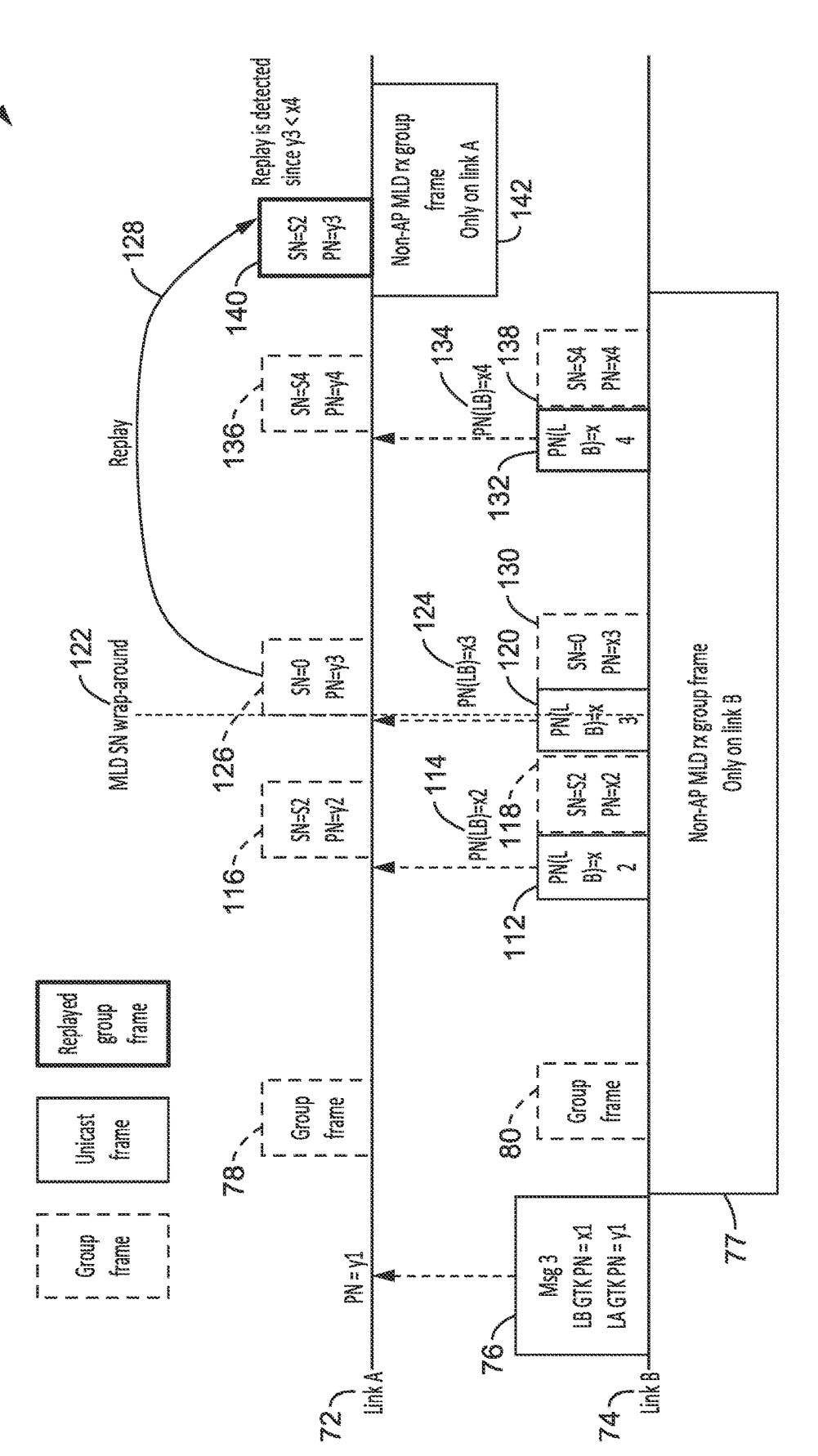
FIG. 7 is a communications diagram of overcoming the replay attack seen in FIG. 5, according to at least one embodiment of the present disclosure.

FIG. 6 and FIG. 7 illustrate examples 70, 110 on overcoming the issues seen in FIG. 4 and FIG. 5. The following describes the figures, and further explanation of how these operate to thwart the attack is discussed in a later section.

2.2.1. Solution 1

In FIG. 6 is shown an example embodiment 70 of a solution to Example Issue 1A of the replay attacks described in previous sections. The figure depicts interaction between link A 72 and link B 74.

In this example link A is used to broadcast a message to advertise the PN of the group addressed frames that recently sent/received on link B. The broadcast message could be a packet identifier or a portion of a packet identifier, or a difference of values of packet identifiers, such as compared to the identifier of the same type of frame, of a group addressed or broadcast frame that has been recently sent on link B, or is to be sent on link B, and could be included in a signaling message (e.g., unicast frames) sent on link A.

The figure depicts message 3 (Msg 3) 76 sent on link B which has link B (LB) GTK PN=x1, and link A (LA) GTK PN=y1. Due to the MLD feature, the non-AP MLD operating on both link A and link B synchronize the information of Msg 3 from the affiliated non-AP STA on link B to the affiliated non-AP STA on link A.

The figure depicts a non-AP MLD operating on two links, which are denoted as link A and link B, that at first is only monitored on link B and receiving group addressed frames only on link B for certain duration 77. During this time. the non-AP MLD receives group addressed frames 80, 84, 94, 100 on link B. The group addressed frames should carry the SN and PN. For illustration purposes, the figure only shows SN and PN in the group addressed frames when the replay attack is about to occur. Thus, the first group addressed frame 80 on link B doesn't show the SN and PN.

The non-AP MLD may not monitor on link A, during the time 77 when it only monitors link B, and when there are several group addressed frames 78, 82, 90, 98 transmitted on link A. For illustration purposes, the figure only shows the SN and PN in the group addressed frames when the replay attack is about to occur. Thus, the first group address frame 78 on link A doesn't show the SN and PN.

When the non-AP MLD receives packet 84 with SN=S2 and PN=x2 on link B, it broadcasts the packet identifier on link A in a message 86 with an indication that PN=x2 on link B. Similarly, when the non-AP MLD receives packet 94 with SN=0, PN=x3 on link B, it broadcasts the packet identifier on link A in a message 96 indicating PN=x3 on link B. And when the non-AP MLD receives packet 100 with SN=S4, PN=x4 on link B, it broadcasts the packet identifier on link A in a message 102 with indicating the PN=x4 on link B. After broadcasting message 102 on link A, the non-AP MLD switches to monitor only on link A 106 and receive Group Addressed frames only on link A.

Before the non-AP MLD switch to receive Group Addressed frame only on link A 106, there was an MLD level SN wrap-around event 88, which causes the SN of the packets transmitted on both link A and link B to be reset to zero. Thus, the Group Addressed frame 90 on link A resets SN=0 and the Group Addressed frame 94 on link B resets SN=0. Before the MLD SN wrap-around event 88, the last Group Addressed frame transmitted 82 on link A indicates that SN=S2 and PN=y2. After the MLD SN wrap-around event 88, several Group Addressed frames are transmitted on link A including Group Addressed frame 90 with SN=0, PN=y3, Group Addressed frame 98 with SN=S4, PN=y4.

After the non-AP MLD switches to receive Group Addressed frame only on link A 106, the non-AP MLD receives a Group Addressed frame 104 with SN=S2, PN=y3 on link A. This Group Addressed frame 104 is a replay attack frame which is a replay 92 of the first Group Addressed frame 90 on link A after the MLD SN wrap-around 88 and in which the SN is modified from to S2. The non-AP MLD receives the Group Addressed frame 90, which identifies it is a replay attack since the PN y3 is smaller than the most recent PN of link B that was broadcasted on link A.

By way of example and not limitation, in at least one embodiment/mode/option, the following variations should be noted. (a) The packet identifier may be the value of Packet Number (PN) for a group addressed Data Frame. (b) The packet identifier may be the value of the IPN or BIPN field in MME included in a group addressed or broadcast Management Frame. (c) A portion of a packet identifier may be the N Most Significant Bits (MSB) of the packet identifier. (d) A portion of a packet identifier may be the N Least Significant Bits (LSB) of the packet identifier. (e) The signaling message may be a Beacon frame. (f) The signaling message may be a Data frame with MAC header fields carrying the packet identifier. (g) The signaling message may be a probe response or ML (Multi-link) probe response frame. (h) The signaling message may be a unicast frame that is transmitted by AP of link A to a non-AP MLD. The frame may be solicited by the non-AP MLD. (i) The non-AP MLD receiving the signaling message may have been previously only monitoring link A, but not link B, and thus it does not have an updated PN for group addressed data frames or IPN/BIPN for the group addressed/broadcast management frames sent on link B.

2.2.2. Solution 2

FIG. 7 illustrates an example embodiment 110 of a solution to Example Issue 1B. Again, the figure depicts link A 72 and link B 74 of an MLD. A message 3 (Msg 3) is sent on link B and indicating link B (LB) GTK PN=x1, and link A (LA) GTK PN=y1. Due to the MLD feature, the non-AP MLD operating on both link A and link B synchronizes the information of Msg 3 from the affiliated non-AP STA on link B to the affiliated non-AP STA on link A. In this example, link B is used to broadcast a message to advertise the packet identifier information of the group addressed frames that is recently send or to be send on link B. The link B broadcast message may have a known periodicity, such that its own IPN can be verified.

The figure depicts a non-AP MLD operating on two links, which are denoted as link A and link B, may at first be only monitored on link B and receiving group addressed frames only on link B for certain duration 77. During this time. the non-AP MLD receives group addressed frames 80, 118, 130, 138 on link B. The group addressed frames should carry the SN and PN. For illustration purposes, the figure only shows the SN and PN in the group addressed frames when the replay attack is about to occur. Thus, the first group addressed frame 80 on link B doesn't show the SN and PN.

The non-AP MLD may not monitor on link A, during time 77 when it only monitors link B, and when there are several Group Addressed frames 78, 116, 126, 136 transmitted on link A. For illustration purposes, the figure only shows the SN and PN in the group addressed frames when the replay attack is about to occur. Thus, the first group address frame 78 on link A doesn't show the SN and PN.

Before the Group Addressed frame 118 with SN=S2, PN=x2 is transmitted on link B, a message 112 indicates the packet identifier of the Group Addressed frame 118 is sent on link B. The affiliated non-AP STA of the non-AP MLD on link B synchronizes 114 the message of PN=x2 on link B to another non-AP STA affiliated with the same non-AP MLD and is on link A. Similarly, before the Group Addressed frame 130 with SN=0, PN=x3 is transmitted on link B, a message 120 indicates the packet identifier of the Group Addressed frame 130 is sent on link B. The affiliated non-AP STA of the non-AP MLD on link B synchronizes 124 the message of PN=x3 on link B to another non-AP STA affiliated with the same non-AP MLD and is on link A. Before the Group Addressed frame 138 with SN=S4, PN=x4 is transmitted on link B, a message 132 indicates the packet identifier of the Group Addressed frame 138 is sent on link B. The affiliated non-AP STA of the non-AP MLD on link B synchronizes 134 the message of PN=x4 on link B to another non-AP STA affiliated with the same non-AP MLD and is on link A.

Before the non-AP MLD switches to receive Group Addressed frame only on link A 142, there was an MLD level SN wrap-around event 122, which causes the SN of the packets transmitted on both link A and link B to reset to zero. Thus, the Group Addressed frame 126 on link A resets SN=0 and the Group Addressed frame 130 on link B resets SN=0. Before the MLD SN wrap-around event 122, the last Group Addressed frame transmitted 116 on link A indicates that SN=S2, PN=y2. After the MLD SN wrap-around event 122, several Group Addressed frames are transmitted on link A including Group Addressed frame 126 with SN=0, PN=y3, Group Addressed frame 136 with SN=S4, PN=y4.

After the non-AP MLD switches to receive a Group Addressed frame only on link A 142, the non-AP MLD receives a Group Addressed frame 140 with SN=S2, PN=y3 on link A. This Group Addressed frame 140 is a replay attack frame which is a replay 128 of the first Group Addressed frame 126 on link A after the MLD SN wrap-around 122 and modify the SN from 0 to S2. The non-AP MLD receives the Group Addressed frame 140 identifies it is a replay attack since the PN y3 is smaller than the most recent PN of link B that was synchronized from the affiliated non-AP STA on link B to another non-AP STA affiliated with the same non-AP MLD on link A.

By way of example and not limitation, in at least one embodiment/mode/option, the following variations should be noted. (a) The packet identifier may be the value of a Packet Number (PN) for a group addressed Data Frame. (b) The packet identifier may be the value of an IPN/BIPN field in MME included in a group addressed Management Frame. (c) A portion of a packet identifier may be the N Most Significant Bits (MSB) of the packet identifier. (d) A portion of a packet identifier may be the N Least Significant Bits (LSB) of the packet identifier. (e) The signaling message may be a Beacon frame. (f) The signaling message may be a Delivery Traffic Indication Message (DTIM) Beacon frame. (g) The signaling message may be a probe response or ML (Multi-link) probe response frame. (h) The signaling message may be a unicast frame that is transmitted by the AP of link B to a non-AP MLD. The frame may be solicited by the non-AP MLD. (i) The signaling message may be a group addressed/broadcast management frame, and the freshness of the packet identifier (IPN/BIPN) of the signaling message may be derived based on the procedure in 1. (j) The signaling message may be a group addressed/broadcast management frame, and the freshness of the packet identifier (IPN/BIPN) of the signaling message may be derived based on the procedure in 3. (k) The numbering space/counter of the packet identifier in the signaling message in (i) and (j) may be different or independent from the numbering space/counter of the packet identifier in (b).

2.3. Description 3

The expected last packet identifier or a portion of the expected last packet identifier of the signaling message sent on link B as described in Section 2.2.2. may be derived by the receiver of the message with a certain accuracy based on the following. (a) The expected transmission frequency/periodicity of the signaling message, such as Beacon interval of a Beacon frame. (b) The starting value of a packet identifier and a starting time, such a starting value as BIPN/IPN in the (MLO) BIGTK KDE in the group key handshake or in four-way handshake messages, and the time of the handshake. (c) The elapsed number of periods based on the frequency in item (a) from the starting time. (d) For example, the BIPN=x signaled in a four-way handshake for link B, and there are N TBTTs since the four-way handshake on link B, then the expected last packet identifier is x+N−1 if the BIPN is incremented by 1 for each beacon frame on link B and assuming the beacon of the most recent TBTT has not been transmitted.

2.4. Description 4

For an AP supporting procedure in Section 2.3, and transmitting the signaling message. For example, the packet identifier of the signaling message is incremented by a known number (e.g., 1) in a subsequent message.

2.5. Description 5

The non-AP MLD in the problem description, in this example can use the procedure in Section 2.2.1. prior to switching to link B, to obtain or derive the packet identifier for updating the replay counter(s) of link B's BIGTK/IGTK/GTK. (a) For example, if the most recent PN=x of GTK of link B is advertised on the beacon of link A, then the non-AP updates its link B replay counter for GTK with x. After switching to link B for the receiving group addressed data frames, replayed group addressed data frames can be detected. (b) For example, if the most recent BIPN=x of BIGTK of link B is advertised on the beacon of link A, then the non-AP can update its link B replay counter for BIGTK with x. After switching to link B for receiving the Beacon, the replayed Beacon frames can be detected. (c) For example, if the most recent BIPN/IPN/PN LSBs of BIGTK/IGTK/GTK of link B is advertised on the beacon of link A and is changed from a larger value to a smaller value, then the non-AP MLD may infer that the BIPN/IPN/PN MSBs of BIGTK/IGTK/GTK of link B has been incremented by 1.

2.6. Description 6

The non-AP MLD in the problem description, can use the procedure in Section 2.3. to identify the expected last packet identifier of a (broadcast) signaling message on link B, such as a DTIM beacon. The replay counter for the signaling message may be updated by the expected last packet identifier derived in Section 2.3. The non-AP MLD may use the updated replay counter to determine the validity of the (broadcast) signaling message received on link B.

2.7. Description 7

The valid (broadcast) signaling message on link B can contain the information described in Section 2.2.1. or Section 2.2.2. for the receiver to update the replay counters of other group addressed, or broadcast frames that do not have a known periodicity.

2.8. Description 8

The AP supporting the procedure described in Section 2.3. and Section 2.4. may increment the packet identifier based on the defined periodicity of the signaling message, even when the signaling message is not transmitted. (a) For example, for the BIPN, AP may increment it by 1 at a TBTT even if the beacon frame intended for this TBTT is not transmitted/skipped due to AP power save.

3. RSNE Issue 3.1. Problem

In IEEE P802.11Be™/D2.0, May 2022 in the message 3 of a four-way handshake, the Robust Security Network Element (RSNE) included only identifies the AP MLD advertised RSNE. It does not include an option for the AP MLD to upgrade the pairwise cipher suite. For example, if in an association request, non-AP MLD indicates CCMP-128 in RSNE, AP MLD may upgrade the cipher to GCMP-256 which is mandatory for EHT. The Mismatch of the pairwise cipher suite between the non-AP MLD and the AP MLD will cause the non-AP MLD to decline the association with that AP MLD.

3.2. Solution

To resolve this issue at least one of the following steps is taken. (a) Allow the AP MLD to include in message 3 of the 4-way handshake a second Robust Security Network Element (RSNE) with a new pairwise cipher suite in the MLO link key data encapsulation (KDE) for one of the links (e.g., the one associated with the current link exchanging four-way handshake). It will be noted that in both this section and previous section, message 3 is the same form of package. (b) Allow the AP MLD to include in message 3 a key data part as an alternative RSNE either in or outside of MLO link KDE to signal a new pairwise cipher suite. (c) Mandating in an association request RSNE does not contain a weaker pairwise cipher than GCMP-256.

FIG. 8 illustrates an example embodiment 190 of Robust Security Network Element (RSNE).

The Group Data Cipher Suite field contains the cipher suite selector used in the BSS to protect group addressed Data frames. The Pairwise Cipher Suite Count field indicates the number of pairwise cipher suite selectors that are contained in the Pairwise Cipher Suite List field. The value 0 is reserved. The Pairwise Cipher Suite List field contains a series of cipher suite selectors that indicate the pairwise cipher suite(s) that can be used to protect individually addressed Data frames and, when management frame protection is negotiated, to protect individually addressed robust Management frames. The Group Management Cipher Suite field contains the cipher suite selector that indicates the cipher suite used in the BSS to protect group addressed robust Management frames. The Pairwise Cipher Suite List field contains a series of cipher suite selectors that indicate the pairwise cipher suites used in the BSS to protect individually addressed Data frames. Table 1 depicts Cipher suite selectors which is a copy of table 9-186 from the cited draft.

4. NSTR Mobile AP MLD 4.1. Problem

In IEEE P802.11Be™/D2.0 Draft of May 2022 an NSTR mobile AP MLD cannot perform transmission on one link while receiving on another link. This restriction limits overall network utilization.

4.2. Solution

In view of the issues arising above, the following processes for the AP and non-AP MLDs should be incorporated or specified for triggered TXOP sharing.

An NSTR mobile AP MLD, when transmitting a MU-RTS TXS on both links simultaneously, the MU-RTS TXS on both links should be addressed to the STAs affiliated to the same non-AP MLD. The addressed non-AP MLD, if responding to the CTS on the non-primary link, should also be responding to the CTS on the primary link. The addressed non-AP MLD, if responding to a CTS on the primary link, may not respond to the CTS on the non-primary link. If responding on both links, the non-AP MLD should align its non-TB PPDU transmission on both links within the allocation duration. If responding on both links, the non-AP may use Single Response Scheduling (SRS) control to align the PPDU duration for the responses to the non-TB PPDUs on both links.

Figure 9:
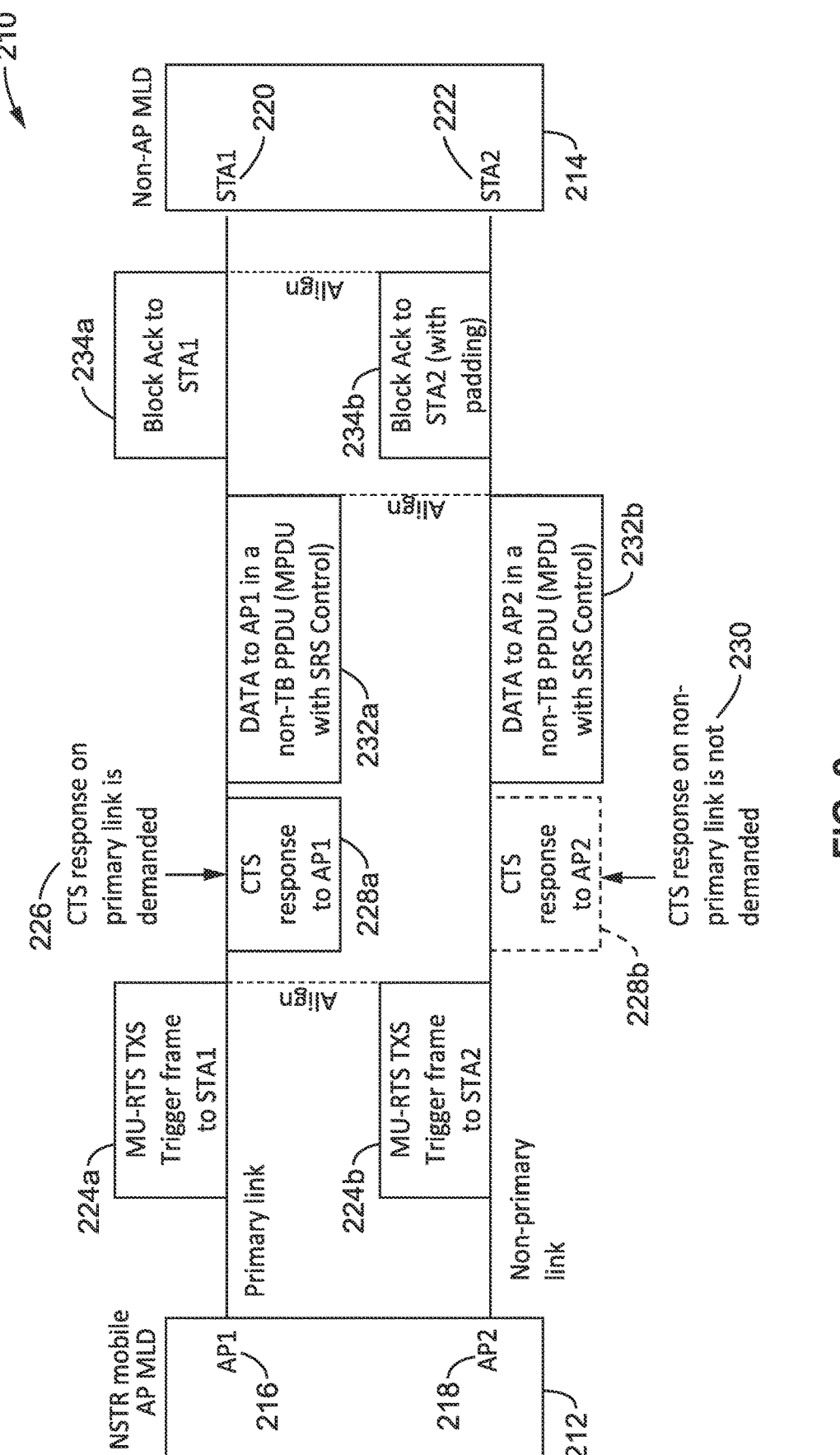
FIG. 9 is a communications diagram of a MU-RTS TXS Trigger frame being used with Triggered TXOP sharing procedure on NSTR links, according to at least one embodiment of the present disclosure.

FIG. 9 illustrates an example embodiment 210 of MU-RTS TXS Trigger frame being used with Triggered TXOP sharing procedure on NSTR links. The figure depicts interaction between an AP MLD 212, having AP1 216 and AP2 218, and a non-AP MLD 214 having STA1 220 and STA2 222.

AP1 and AP2 are shown transmitting (aligned) MU-RTS TXS Trigger frames 224a, 224b to STA1 and STA2 affiliated with the same non-AP MLD. The addressed non-AP MLD, if responding with a Clear-To-Send (CTS) on the primary link 228a, together with which, the non-AP MLD may also respond with a CTS on the non-primary link 228b.

If responding on both links, the non-AP MLD should align its non-TB PPDU transmissions 232a, 232b on both links within the allocation duration. If responding on both links, the non-AP may use SRS control in these PPDUs to align the PPDU duration for the responses to the non-TB PPDUs on both links.

In response to receiving the PPDUs, the APs in the AP MLD send Acks 234a, 234b which are also aligned, using padding as necessary.

5. TBTT Information Field in RNR 5.1. Problem

In IEEE P802.11Be™/D2.0 Draft of May 2022, the Target Beacon Transmission Time (TBTT) information field in RNR when the TBTT information field type is set to 1 is only defined for a length equal to 3. If there is a future extension to this type with a greater length than 3, then an existing non-AP would not recognize it. This causes the same information for the same non-primary link AP (e.g., MLD ID, link ID) to be repeated in different Neighbor AP information fields.

12

5.2. Solution

In this solution, the MLD parameters field is configured to always occupy the first 3 octets when the TBTT information field type is 1 and having a length greater than or equal to 3. An existing non-AP would then properly ignore the octets beyond length 3.

FIG. 10 through FIG. 14 illustrates an example embodiments 250, 270, 290, 310 and 330 of data fields relating to TBTT.

In FIG. 10 is shown an RNR format having Element ID, Length, and Neighbor Information fields.

In FIG. 11 is shown a Neighbor AP information field format showing TBTT Information header, Operating Class, Channel Number, and TBTT Information Set fields.

In FIG. 12 is shown TBTT Information header subfield, showing TBTT Information field type, Filtered Neighbor AP, Reserved, TBTT Information Count, and TBTT Information Length subfields.

In FIG. 13 is shown a TBTT Information field with Neighbor AP TBTT Offset, optional Basic Service Set ID (BSSID), optional Service Set ID (SSID), BSS Parameters, 20 MHz Power Spectral Density (PSD), and MLD Parameter subfields.

In FIG. 14 is shown the MLD Parameter subfield from FIG. 13. In IEEE 802.11be, the TBTT Information Field Type subfield identifies, together with the TBTT Information Length subfield, the format of the TBTT Information field. It is set to 0 or 1, with values of 2 and 3 being reserved.

As shown in FIG. 14, if the TBTT Information Field Type subfield is set to 1, then the TBTT Information Length subfield is set to 3. For TBTT Information Length subfield values higher than 3, the MLD parameters field should always occupy the first 3 octets when the TBTT information field type is 1 with a length greater than or equal to 3, and the remaining octets should be reserved.

6. Quiet Channel Elements in an Association/Reassociation 6.1. Problem

In IEEE P802.11Be™/D2.0 Draft of May 2022, Quiet (channel) elements, Max channel switch time elements for a reported link can be included in an association/reassociation response. However, the following issues arise. (a) In an association/reassociation response sent close to a TBTT of a reported link in the case of a frame carrying a quiet (channel) element of a link, it is difficult to determine if the information conveyed in the frame was determined, or created, corresponding to a time before reporting the link's TBTT, or after the TBTT, as the association/reassociation frame itself does not have a timestamp. As a result, the frame is unicast and is subject to retransmission. (b) In a ML probe response or association/reassociation response frame, it cannot be accurately determined what was the last beacon time of the reported link when the frame is sent after the reported link's last beacon and before the reported link's new beacon. The Max channel time does not have a reference starting point.

6.2. Solution

A reference time stamp is incorporated in the association/reassociation. The time indicated need not be related to the time that the association/reassociation response frame is received, but may be in reference to the TSF of the reporting link. The non-AP MLD may use the reference time stamp to determine to which TBTT of the reported link is relevant to the association/reassociation response.

The reference time stamp in the association/reassociation frame can be utilized as a reference point for calculating the expected time of the first beacon of the reported link on the new channel. The time stamp in the ML probe response frame can be used as a reference point for calculating the expecting time of the first beacon of the reported link on the new channel.

A Reduced Neighbor Report (RNR) may be included in the association/reassociation response frame to convey new channel information about the reporting link undergoing switching.

During the four way handshake, Operating Channel Information (OCI) key data encapsulation (KDE) may not be included for the reported link that has yet finished switching.

During the four-way handshake, OCI KDE may be included for the reported link using the channel information conveyed in the association/reassociation response frame (e.g., the reduced neighbor report if included in the frame).

During the four-way handshake, OCI KDE may be included for the reported link using the channel information conveyed in the ML probe response frame (e.g., the reduced neighbor report in the frame).

In an association/reassociation request, a BSS parameter change count may be included for a link, so as to allow the AP to determine if the information that the non-AP has is up to date; for example, whether the non-AP referenced channel for the reported link undergoing switching, is the same channel AP that the link is attempting to switch to.

Figure 15:
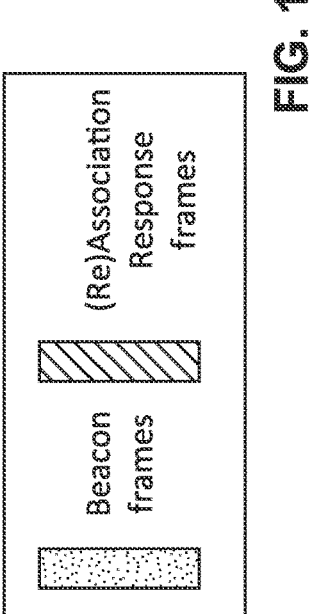
FIG. 15 is a communications diagram of using a reference time stamp in an association/reassociation response from an AP carrying a Quiet element, according to at least one embodiment of the present disclosure.

FIG. 15 illustrates an example embodiment 410 of using a reference time stamp in an association/reassociation response from an AP carrying a Quiet element. Exemplified in the figure are operations of link 1 (AP1) 412 and link 2 (AP2) 414 of an AP MLD.

AP2 is shown sending beacon frame 416. Beacon frames 418, 420, 424 and 426 transmitted by AP1 (the affected AP) each include a Quiet element to indicate a scheduled quiet interval on link 1. It is shown in that figure that the Quiet count is decreasing from 4 in beacon 418 down to a Quiet count of 1 in beacon frame 426.

So, from beacon 418 until beacon 434 at which time the quiet interval 440 begins on link 1, AP2 (the reporting AP) includes a Quiet element 422 in the beacon frame for the Per-STA Profile sub-element corresponding to AP1 in the Basic Multi-Link element carried in its Beacon frames. A Quiet element will also be included in the Per-STA Profile sub-element of the Basic Multi-Link element corresponding to AP1 carried in the Probe Response frames transmitted by AP2. The values of the Quiet Count field, Quiet Offset field, and the Quiet Duration field of the Quiet element carried on link 2 are set by AP2 with reference to link 1. As the value of the Beacon Interval for AP2 is greater (larger) than the value of the beacon interval for AP1, the Quiet Count field of the Quiet element carried in the Per-STA Profile sub-element corresponding to AP1 is decremented at a faster rate (i.e., 2 in this example) in every subsequent beacon transmitted by AP2, thus it has been shown that beacon 422 with a Quiet count of 2, which is being decremented to a Quiet count of 1, for beacon 428.

A non-AP STA affiliated with a non-AP MLD, which is capable of operating on link 2, transmits an Association/reassociation Request frame 430 to AP2 (not shown in the figure), in order to perform multi-link setup. The multi-link setup includes link 1 as one of the links. Since the (Re) Association Response frame 430 is transmitted by AP2 in a time period T1 432 before the quiet interval has started on link 1. AP2 includes the Quiet element in the per-STA profile corresponding to AP1 in the Association/reassociation Response frames 430, 442 it transmits. The Quiet Count field of the Quiet element carried in the Association/reassociation Response frame is set to 1 to indicate that the quiet interval on link 1 will start in the next beacon interval on link 1. The Association/reassociation Response frame carries the time stamp "T1", explicitly or implicitly, with reference to the TBTT on link 1, indicating that after T1 the next beacon interval on link 1 will start.

A non-AP STA affiliated with a non-AP MLD, which is capable of operating on link 2, transmits an Association/reassociation Request frame to AP2 (not shown in the figure), in order to perform multi-link setup. The multi-link setup includes link 1 as one of the links. Since the Association/reassociation Response frame is transmitted by AP2 after the quiet interval has started on link 1; AP2 includes the Quiet element in the per-STA profile corresponding to AP1 in the Association/reassociation Response frame it transmits. The Quiet Count field of the Quiet element carried in the Association/reassociation Response frame 442 is set to 128 to indicate that the quiet interval on link 1 started in the beacon interval that occurred one TBTT in the past on link 1. The Association/reassociation Response frame 442 carries the time stamp "T2" 444, explicitly or implicitly, with reference to the TBTT on link 1, indicating that a T2 has been passed after the previous beacon interval starts on link 1. After which a regular beacon frame 446 is shown transmitted by AP2 during the quiet duration of AP1.

7. END Alignment

7.1. Problem

In IEEE P802.11Be™/D2.0 Draft of May 2022, the PPDU end alignment between links in certain scenarios requires that additional MPDUs of other TIDs cannot be included in a PPDU to facilitate end alignment, such as the following examples. (a) For an Uplink (UL) or Single-User (SU) PPDU, if the primary AC for the PPDU on link 1 has a TXOP limit of 0 and the MLD intends to extend the PPDU on link 1 to align the PPDU on link 2. (b) For a UL or SU PPDU, if the primary AC for the PPDU on link 1 has TXOP limit greater than zero, and the MLD wants to extend the PPDU on link 1 to align the PPDU on link 2 by including MPDUs of lower priority than the primary AC.

7.2. Solution

To resolve these issues the MLD may aggregate an MPDU having a TID with priority which is the same or higher than the primary AC of the TXOP, for the purpose of extending the PPDU length to align the end of the PPDU with the end of a PPDU on another link. This resolution applies when (a) The TXOP limit for the primary AC is zero. And when (b) The TXOP limit for the primary AC is greater than 0 and the extension of the PPDU may be beyond TXOP limit.

The MLD may aggregate an MPDU having a TID priority lower than the primary AC of the TXOP for the purpose of extending the PPDU length to align the end of the PPDU on another link. This resolution applies when (a) The TXOP limit for the primary AC is greater than 0 and the extension of the PPDU is less than or equal to TXOP limit; and when (b) The primary AC of the TXOP of the PPDU to be aligned to (i.e., to later end time) may have a higher or equal priority AC than the primary AC of the PPDU to be extended. And the extension can be beyond the TXOP limit for the PPDU to be extended.

Figure 16:
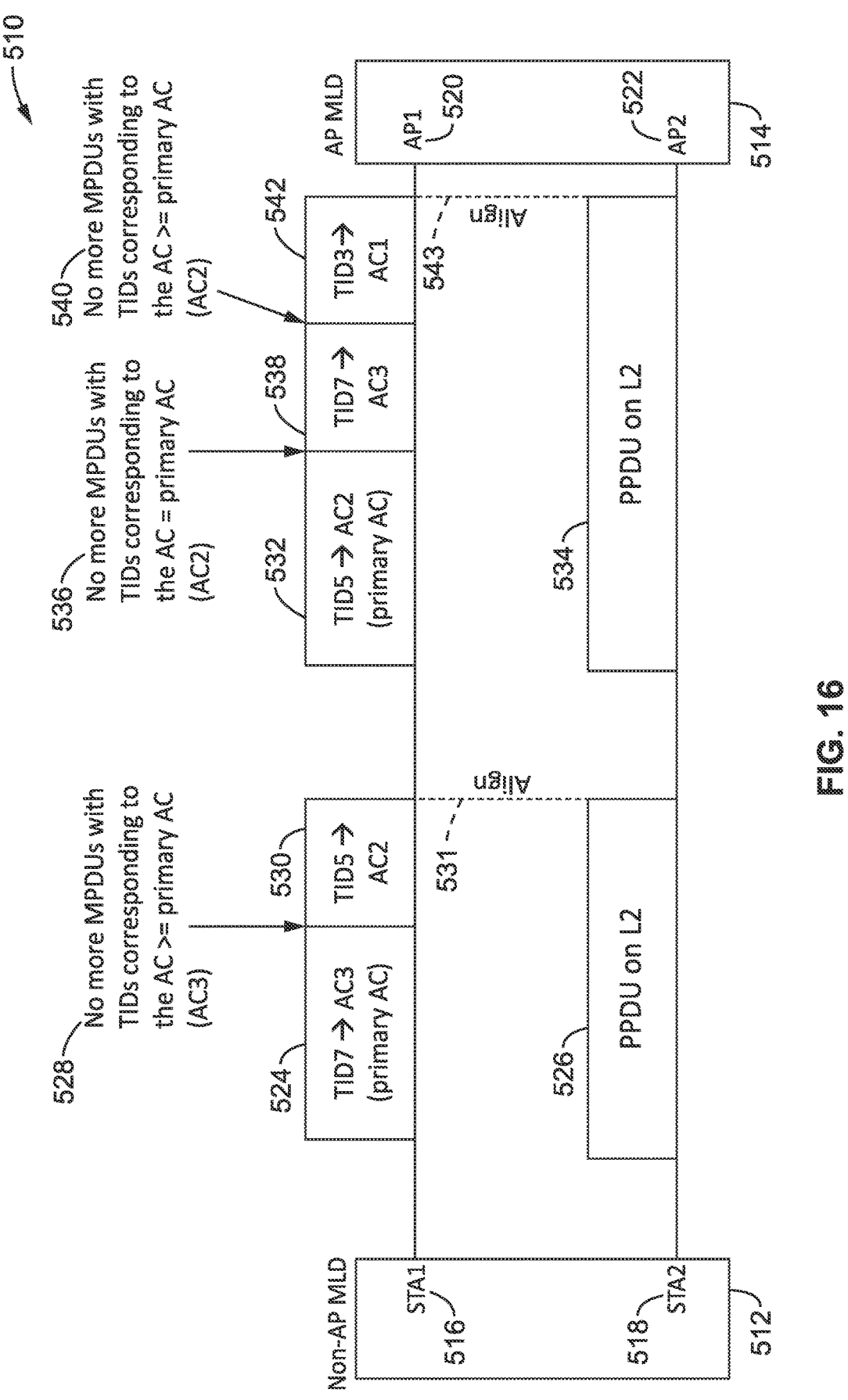
FIG. 16 a communications diagram of multi-TID aggregation for PPDU end alignment, according to at least one embodiment of the present disclosure.

FIG. 16 illustrates an example embodiment 510 of multi-TID aggregation for PPDU end alignment. The figure depicts communication in relation to a non-AP MLD 512, having STA1 516 and STA2 518, and an AP MLD 514 having AP1 520 and AP2 522.

The figure shows an example of how to allow aggregation of MPDUs with TIDs which correspond to a lower priority than the primary AC for PPDU end alignment.

In a first PPDU alignment example, STA1 aggregates MPDUs 530 with TID5, which maps to AC2, after it transmits MPDUs 524 of TID7, which maps to AC3, when there are no more 528 MPDUs with TIDs corresponding to the AC higher than or equal to the primary AC (AC3). It can be seen that the completion of transmission aligns 531 between the end of MPDUs 530 and end of PPDU 526 on link 2.

In a second PPDU alignment example, after STA1 is transmitting MPDUs 532 with TID5, which maps to AC2 (primary AC), then it aggregates MPDUs 538 with TID7, which maps to AC3, after it is determined 536 that there are no more MPDUs with TIDs corresponding to the AC equal to the primary AC (AC2). Then, STA1 aggregates MPDUs 542 with TID3 when it is determined 540 that there are no more MPDUs with TIDs corresponding to the AC higher than or equal to the primary AC (AC2). Again, the alignment 543 on the two links is clearly shown.

8. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless multiple-link device (MLD), having stations (STAs) connected to a first link (link A) and a second link (link B), and configured for performing frame transmissions between the medium access control (MAC) layers of an IEEE 802.11 network as an access point (AP) MLD or a non-AP MLD, for wirelessly communicating with other STAs using a carrier sense multiple access/collision avoidance (CSMA/CA) mechanism on a wireless local area network (WLAN) in which enhanced distributed channel access (EDCA) is utilized for random channel access on all the links; (b) a processor coupled to said MLD for operating on the WLAN; (c) a non-transitory memory storing instructions executable by the processor for communicating with other STAs; and (d) wherein said instructions, when executed by the processor, perform steps of a wireless communications protocol for said MLD to protect against group address replay attacks, comprising: (d)(i) wherein a non-AP MLD has multiple affiliated non-AP STAs operating over multiple links and is associated with an AP MLD on multiple links which is always in an awake state on link A and link B; (d)(ii) wherein the non-AP MLD monitors a link A and is in doze state on another link B, and can switch to monitor link B and be in doze state on link A; wherein when the non-AP MLD is in doze state on a specific link, it is unable to receive group addressed or broadcast frames on that specific link; and (d)(iii) updating replay counters associated with that specific link beacon integrity group temporal key (BIGTK), or integrity group temporal key (IGTK), or group temporal key (GTK), by the non-AP MLD when monitoring a specific link, based on the received group addressed/broadcast frames on that specific link.

A method of performing wireless communication in a network to protect against group address replay attacks, comprising: (a) utilizing a multiple-link devices (MLD), having stations (STAs) connected to a first link (link A) and a second link (link B), and configured for performing frame transmissions between the medium access control (MAC) layers of an IEEE 802.11 network as an access point (AP) MLD or a non-AP MLD, for wirelessly communicating with other STAs using a carrier sense multiple access/collision avoidance (CSMA/CA) mechanism on a wireless local area network (WLAN) in which enhanced distributed channel access (EDCA) is utilized for random channel access on all the links to perform steps of a wireless communications protocol for said MLD; (b) wherein a non-AP MLD has multiple affiliated non-AP STAs operating over multiple links and is associated with an AP MLD on multiple links which is always in an awake state on link A and link B; (c) wherein the non-AP MLD monitors a link A and is in doze state on another link B, and can switch to monitor link B and be in doze state on link A; wherein when the non-AP MLD is in doze state on a specific link, it is unable to receive group addressed or broadcast frames on that specific link; and (d) updating replay counters associated with that specific link beacon integrity group temporal key (BIGTK), or integrity group temporal key (IGTK), or group temporal key (GTK), by the non-AP MLD when monitoring a specific link, based on the received group addressed/broadcast frames on that specific link.

The apparatus or method of any preceding implementation, wherein the non-AP MLD receives a signaling message on link A, which includes a packet identifier or a portion of a packet identifier, or a difference of values of packet identifier in comparison to the identifier of the same type of frame, of the group addressed/broadcast frame on link B, from an AP MLD which has recently sent, or is about to send, a group addressed or broadcast frame on link B.

The apparatus or method of any preceding implementation, wherein the packet identifier is either (i) a packet number (PN) value for a group addressed data frame, or (ii) an IGTK PN (IPN), or BIGTK PN (BIPN) value field in a management message integrity code element (MME) included in a group addressed or broadcast management frame.

The apparatus or method of any preceding implementation, wherein a portion of a packet identifier comprises either an N most significant bits (MSB) of the packet identifier, or an N least significant bits (LSB) of the packet identifier.

The apparatus or method of any preceding implementation, wherein the signaling message is selected from the group of signaling messages consisting of beacon frame, a data frame with MAC header fields carrying the packet identifier, a probe response or ML (Multi-link) probe response frame, and a unicast frame that is transmitted by AP of link A to a non-AP MLD.

The apparatus or method of any preceding implementation, wherein the signaling message is solicited from an AP MLD by the non-AP MLD.

The apparatus or method of any preceding implementation, wherein the non-AP MLD receiving the signaling message was not monitoring a given link and did not have an updated PN for group addressed data frames or IPN/BIPN for the group addressed or broadcast management frames sent on that link, prior to receiving the signaling message.

The apparatus or method of any preceding implementation, wherein the non-AP MLD receives a signaling message on a link it was not previously monitoring, said signaling message including a packet identifier or a portion of a packet identifier of the group addressed/broadcast frame, as sent by an AP MLD that sent, or will send, a group addressed/broadcast frame.

The apparatus or method of any preceding implementation, wherein the packet identifier is a packet number (PN) value for a group addressed data frame, or an IPN/BIPN value in MME included in a group addressed Management Frame;

The apparatus or method of any preceding implementation, wherein the packet identifier includes an N most significant bits (MSB) of the packet identifier, or a N least significant bits (LSB) of the packet identifier.

The apparatus or method of any preceding implementation, wherein the signaling message is selected from the group of signaling messages consisting of a beacon frame, a DTIM beacon frame, a probe response or ML (Multi-link) probe response frame, a unicast frame that is transmitted from an AP MLD, a group addressed/broadcast management frame, The apparatus or method of any preceding implementation, wherein a timeliness (freshness) determination of the packet identifier (IPN/BIPN) in the signaling message is derived based on the procedure comprising: (a) wherein the packet identifier is either (i) a packet number (PN) value for a group addressed data frame, or (ii) an IGTK PN (IPN), or BIGTK PN (BIPN) value field in a management message integrity code element (MME) included in a group addressed or broadcast management frame, and wherein a portion of a packet identifier comprises either an N most significant bits (MSB) of the packet identifier, or an N least significant bits (LSB) of the packet identifier and wherein the signaling message is selected from the group of signaling messages consisting of beacon frame, a data frame with MAC header fields carrying the packet identifier, a probe response or ML (Multi-link) probe response frame, and a unicast frame that is transmitted by AP of link A to a non-AP MLD; or (b)(i) the expected transmission frequency/periodicity of the signaling message; (b)(ii) the starting value of a packet identifier and a starting time; and (b)(iii) the elapsed number of periods based on the expected transmission frequency from the starting time.

The apparatus or method of any preceding implementation, wherein the numbering space or counter of the packet identifier in the signaling message is different or independent from the numbering space or counter of the packet identifier as an N most significant bits (MSB) of the packet identifier, or a N least significant bits (LSB) of the packet identifier.

The apparatus or method of any preceding implementation, wherein the expected last packet identifier or a portion of the expected last packet identifier of the signaling message sent on link B, is derived by the receiver of the message with a certain accuracy as selected from one or more of the following: (a) the expected transmission frequency/periodicity of the signaling message; (b) the starting value of a packet identifier and a starting time; and (c) the elapsed number of periods based on the expected transmission frequency from the starting time.

The apparatus or method of any preceding implementation, wherein the transmitted signaling message contains a packet identifier whose value is incremented by a known number in a subsequent message.

The apparatus or method of any preceding implementation, wherein the non-AP MLD prior to switching to link A obtains or derives a packet identifier for updating the replay counter(s) of link A's BIGTK/IGTK/GTK.

The apparatus or method of any preceding implementation, wherein the non-AP MLD identifies the expected last packet identifier of a signaling message on link B, and the replay counter for the signaling message is updated by the expected last packet identifier; wherein the non-AP MLD uses the updated replay counter to determine the validity of the signaling message received on link B.

The apparatus or method of any preceding implementation, wherein validity of the signaling message on link B for the receiver to update the replay counters of other group addressed/broadcast frames that do not have a known periodicity is based on the procedure comprising: (a) wherein the packet identifier is either (i) a packet number (PN) value for a group addressed data frame, or (ii) an IGTK PN (IPN), or BIGTK PN (BIPN) value field in a management message integrity code element (MME) included in a group addressed or broadcast management frame, and wherein a portion of a packet identifier comprises either an N most significant bits (MSB) of the packet identifier, or an N least significant bits (LSB) of the packet identifier and wherein the signaling message is selected from the group of signaling messages consisting of beacon frame, a data frame with MAC header fields carrying the packet identifier, a probe response or ML (Multi-link) probe response frame, and a unicast frame that is transmitted by AP of link A to a non-AP MLD; or (b)(i) the expected transmission frequency/periodicity of the signaling message; (b)(ii) the starting value of a packet identifier and a starting time; and (b)(iii) the elapsed number of periods based on the expected transmission frequency from the starting time.

The apparatus or method of any preceding implementation, wherein the packet identifier is incremented by an AP MLD based on defined periodicity of the signaling message, even if the signaling message is not transmitted.

The apparatus or method of any preceding implementation, wherein an AP MLD incorporates in a 3 of 4 way handshake, a second robust security network element (RSNE) with a new pairwise cipher suite in the multiple link operation (MLO) link key data encapsulation (KDE) for one of the links, or allow an AP MLD to include in message 3 key data part an alternative RSNE either in or outside of MLO link KDE to signal a new pairwise cipher suite, or mandate in an association request that the RSNE does not contain a weaker pairwise cipher than GCMP-256.

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| Cipher Suite Selectors | | |
|---|---|---|
| OUI | Suite Type | Meaning |
| 00-0F-AC | 0 | Use Group Cipher Suite |
| 00-0F-AC | 1 | WEP-40 |
| 00-0F-AC | 2 | TKIP |
| 00-0F-AC | 3 | Reserved |
| 00-0F-AC | 4 | CCMP-128 |
| 00-0F-AC | 5 | WEP-104 |
| 00-0F-AC | 6 | BIP-CMAC-128 |
| 00-0F-AC | 7 | Group addressed traffic not allowed |
| 00-0F-AC | 8 | GCMP-128 |
| 00-0F-AC | 9 | GCMP-256 |
| 00-0F-AC | 10 | CCMP-256 |

TABLE 1-continued

| Cipher Suite Selectors | | |
|---|---|---|
| OUI | Suite Type | Meaning |
| 00-0F-AC | 11 | BIP-GMAC-128 |
| 00-0F-AC | 12 | BIP-GMAC-256 |
| 00-0F-AC | 13 | BIP-CMAC-256 |
| 00-0F-AC | 14-255 | Reserved |
| other OUI or CID | Any | Vendor-Specific |

What is claimed is:

1. An apparatus for wireless communication in a network, the apparatus comprising:

(a) a wireless multiple-link device (MLD), having stations (STAs) connected to a first link (link A) and a second link (link B), and configured for performing frame transmissions between the medium access control (MAC) layers of an IEEE 802.11 network as an access point (AP) MLD or a non-AP MLD, for wirelessly communicating with other STAs using a carrier sense multiple access/collision avoidance (CSMA/CA) mechanism on a wireless local area network (WLAN) in which enhanced distributed channel access (EDCA) is utilized for random channel access on all the links;

(b) a processor coupled to said MLD for operating on the WLAN;

(c) a non-transitory memory storing instructions executable by the processor for communicating with other STAs; and (d) wherein said instructions, when executed by the processor, perform steps of a wireless communications protocol for said MLD to protect against group address replay attacks, comprising:

(i) wherein a non-AP MLD has multiple affiliated non-AP STAs operating over multiple links and is associated with an AP MLD on multiple links, with the AP always in an awake state on link A and link B;

(ii) wherein the non-AP MLD monitors a link A and is in doze state on another link B, and can switch to monitor link B and be in doze state on link A; wherein when the non-AP MLD is in doze state on a specific link, it is unable to receive group addressed or broadcast frames on that specific link;

(iii) receiving a signaling message from the associated AP MLB, prior to either link A or link B going into a doze state, for updating replay counters associated with that specific link beacon integrity group temporal key (BIGTK), or integrity group temporal key (IGTK), or group temporal key (GTK), by the non-AP MLD when monitoring a specific link, based on the received group addressed/broadcast frames on that specific link;

(iv) wherein upon link A going into a doze state and thus being unable to receive either group addressed or broadcast frames on link A, then link B receives group frames which include a sequence identifier and a packet identifier; and (v) sending signaling messages from the non-AP MLD between its link A and link B for synchronizing packet identifiers for group addressed and broadcast frames; wherein upon switching roles between link A and link B wherein link A is now receiving group frames and link B is going into a doze state, then link A determines an expected last packet identifier from the signaling between link A and link B to in detecting replay attacks, despite sequence identifier wraparound events.

2. The apparatus of claim 1, wherein the non-AP MLD receives a signaling message on link A, which includes a packet identifier or a portion of a packet identifier, or a difference of values of packet identifier in comparison to the identifier of the same type of frame, of the group addressed/broadcast frame on link B, from an AP MLD which has recently sent, or is about to send, a group addressed or broadcast frame on link B.

3. The apparatus of claim 2, wherein the packet identifier is either (i) a packet number (PN) value for a group addressed data frame, or (ii) an IGTK PN (IPN), or BIGTK PN (BIPN) value field in a management message integrity code element (MME) included in a group addressed or broadcast management frame.

4. The apparatus of claim 2, wherein a portion of a packet identifier comprises either an N most significant bits (MSB) of the packet identifier, or an N least significant bits (LSB) of the packet identifier.

5. The apparatus of claim 2, wherein the signaling message is selected from the group of signaling messages consisting of beacon frame, a data frame with MAC header fields carrying the packet identifier, a probe response or ML (Multi-link) probe response frame, and a unicast frame that is transmitted by AP of link A to a non-AP MLD.

6. The apparatus of claim 5, wherein the signaling message is solicited from an AP MLD by the non-AP MLD.

7. The apparatus of claim 2, wherein the non-AP MLD receiving the signaling message was not monitoring a given link and did not have an updated PN for group addressed data frames or IPN/BIPN for the group addressed or broadcast management frames sent on that link, prior to receiving the signaling message.

8. The apparatus of claim 2, wherein the non-AP MLD receives a signaling message on a link it was not previously monitoring, said signaling message including a packet identifier or a portion of a packet identifier of the group addressed/broadcast frame, as sent by an AP MLD that sent, or will send, a group addressed/broadcast frame.

9. The apparatus of claim 8, wherein the packet identifier is a packet number (PN) value for a group addressed data frame, or an IPN/BIPN value in MME included in a group addressed Management Frame.

10. The apparatus of claim 8, wherein the packet identifier includes an N most significant bits (MSB) of the packet identifier, or a N least significant bits (LSB) of the packet identifier.

11. The apparatus of claim 8, wherein the signaling message is selected from the group of signaling messages consisting of a beacon frame, a DTIM beacon frame, a probe response or ML (Multi-link) probe response frame, a unicast frame that is transmitted from an AP MLD, a group addressed/broadcast management frame.

12. The apparatus of claim 11, wherein a timeliness (freshness) determination of the packet identifier (IPN/BIPN) in the signaling message is derived based on the procedure comprising:
   (a) wherein the packet identifier is either (i) a packet number (PN) value for a group addressed data frame, or (ii) an IGTK PN (IPN), or BIGTK PN (BIPN) value field in a management message integrity code element (MME) included in a group addressed or broadcast management frame, and wherein a portion of a packet identifier comprises either an N most significant bits (MSB) of the packet identifier, or an N least significant bits (LSB) of the packet identifier and wherein the signaling message is selected from the group of signaling messages consisting of beacon frame, a data frame with MAC header fields carrying the packet identifier, a probe response or ML (Multi-link) probe response frame, and a unicast frame that is transmitted by AP of link A to a non-AP MLD; or (b)(i) the expected transmission frequency/periodicity of the signaling message; (b)(ii) the starting value of a packet identifier and a starting time; and (b)(iii) the elapsed number of periods based on the expected transmission frequency from the starting time.

13. The apparatus of claim 11, wherein the numbering space or counter of the packet identifier in the signaling message is different or independent from the numbering space or counter of the packet identifier as an N most significant bits (MSB) of the packet identifier, or a N least significant bits (LSB) of the packet identifier.

14. The apparatus of claim 8, wherein the expected last packet identifier or a portion of the expected last packet identifier of the signaling message sent on link B, is derived by the receiver of the message with a certain accuracy as selected from one or more of the following: (a) the expected transmission frequency/periodicity of the signaling message; (b) the starting value of a packet identifier and a starting time; and (c) the elapsed number of periods based on the expected transmission frequency from the starting time.

15. The apparatus of claim 14, wherein the transmitted signaling message contains a packet identifier whose value is incremented by a known number in a subsequent message.

16. The apparatus of claim 14, wherein the non-AP MLD prior to switching to link A obtains or derives a packet identifier for updating the replay counter(s) of link A's BIGTK/IGTK/GTK.

17. The apparatus of claim 14, wherein the non-AP MLD identifies the expected last packet identifier of a signaling message on link B, and the replay counter for the signaling message is updated by the expected last packet identifier; wherein the non-AP MLD uses the updated replay counter to determine the validity of the signaling message received on link B.

18. The apparatus of claim 17, wherein validity of the signaling message on link B for the receiver to update the replay counters of other group addressed/broadcast frames that do not have a known periodicity is based on the procedure comprising:
   (a) wherein the packet identifier is either (i) a packet number (PN) value for a group addressed data frame, or (ii) an IGTK PN (IPN), or BIGTK PN (BIPN) value field in a management message integrity code element (MME) included in a group addressed or broadcast management frame, and wherein a portion of a packet identifier comprises either an N most significant bits (MSB) of the packet identifier, or an N least significant bits (LSB) of the packet identifier and wherein the signaling message is selected from the group of signaling messages consisting of beacon frame, a data frame with MAC header fields carrying the packet identifier, a probe response or ML (Multi-link) probe response frame, and a unicast frame that is transmitted by AP of link A to a non-AP MLD; or
   (b)(i) the expected transmission frequency/periodicity of the signaling message; (b)(ii) the starting value of a packet identifier and a starting time; and (b)(iii) the elapsed number of periods based on the expected transmission frequency from the starting time.

19. The apparatus of claim 14, wherein the packet identifier is incremented by an AP MLD based on defined periodicity of the signaling message, even if the signaling message is not transmitted.

20. The apparatus of claim 1, wherein an AP MLD incorporates in a 3 of 4 way handshake, a second robust security network element (RSNE) with a new pairwise cipher suite in the multiple link operation (MLO) link key data encapsulation (KDE) for one of the links, or allow an AP MLD to include in message 3 key data part an alternative RSNE either in or outside of MLO link KDE to signal a new pairwise cipher suite, or mandate in an association request that the RSNE does not contain a weaker pairwise cipher than GCMP-256.

21. A method of performing wireless communication in a network to protect against group address replay attacks, comprising:

(a) utilizing a multiple-link devices (MLD), having stations (STAs) connected to a first link (link A) and a second link (link B), and configured for performing frame transmissions between the medium access control (MAC) layers of an IEEE 802.11 network as an access point (AP) MLD or a non-AP MLD, for wirelessly communicating with other STAs using a carrier sense multiple access/collision avoidance (CSMA/CA) mechanism on a wireless local area network (WLAN) in which enhanced distributed channel access (EDCA) is utilized for random channel access on all the links to perform steps of a wireless communications protocol for said MLD;

(b) wherein a non-AP MLD has multiple affiliated non-AP STAs operating over multiple links and is associated with an AP MLD on multiple links, with the AP which is always in an awake state on link A and link B;

(c) wherein the non-AP MLD monitors a link A and is in doze state on another link B, and can switch to monitor link B and be in doze state on link A; wherein when the non-AP MLD is in doze state on a specific link, it is unable to receive group addressed or broadcast frames on that specific link;

(d) receiving a signaling message from the associated AP MLB, prior to either link A or link B going into a doze state, for updating replay counters associated with that specific link beacon integrity group temporal key (BIGTK), or integrity group temporal key (IGTK), or group temporal key (GTK), by the non-AP MLD when monitoring a specific link, based on the received group addressed/broadcast frames on that specific link;

(e) wherein upon link A going into a doze state and thus being unable to receive either group addressed or broadcast frames on link A, then link B receives group frames which include a sequence identifier and a packet identifier; and (f) sending signaling messages from the non-AP MLD between its link A and link B for synchronizing packet identifiers for group addressed and broadcast frames; wherein upon switching roles between link A and link B wherein link A is now receiving group frames and link B is going into a doze state, then link A determines an expected last packet identifier from the signaling between link A and link B to in detecting replay attacks, despite sequence identifier wrap-around events.

22. An apparatus for wireless communication in a network, the apparatus comprising:

(a) a wireless multiple-link device (MLD), having stations (STAs) connected to a first link (link A) and a second link (link B), and configured for performing frame transmissions between the medium access control (MAC) layers of an IEEE 802.11 network as an access point (AP) MLD or a non-AP MLD, for wirelessly communicating with other STAs using a carrier sense multiple access/collision avoidance (CSMA/CA) mechanism on a wireless local area network (WLAN) in which enhanced distributed channel access (EDCA) is utilized for random channel access on all the links;

(b) a processor coupled to said MLD for operating on the WLAN;

(c) a non-transitory memory storing instructions executable by the processor for communicating with other STAs; and (d) wherein said instructions, when executed by the processor, perform steps of a wireless communications protocol for said MLD to protect against group address replay attacks, comprising:

(i) wherein a non-AP MLD has multiple affiliated non-AP STAs operating over multiple links and is associated with an AP MLD on multiple links, with the AP always in an awake state on link A and link B;

(ii) wherein the non-AP MLD monitors a link A and is in doze state on another link B, and can switch to monitor link B and be in doze state on link A; wherein when the non-AP MLD is in doze state on a specific link, it is unable to receive group addressed or broadcast frames on that specific link;

(iii) updating replay counters associated with that specific link beacon integrity group temporal key (BIGTK), or integrity group temporal key (IGTK), or group temporal key (GTK), by the non-AP MLD when monitoring a specific link, based on the received group addressed/broadcast frames on that specific link;

(iv) wherein the non-AP MLD receives a signaling message on link A, which includes a packet identifier or a portion of a packet identifier, or a difference of values of packet identifier in comparison to the identifier of the same type of frame, of the group addressed/broadcast frame on link B, from an AP MLD which has recently sent, or is about to send, a group addressed or broadcast frame on link B;

(v) wherein the non-AP MLD receives a signaling message on a link it was not previously monitoring, said signaling message including a packet identifier or a portion of a packet identifier of the group addressed/broadcast frame, as sent by an AP MLD that sent, or will send, a group addressed/broadcast frame;

(vi) wherein the expected last packet identifier or a portion of the expected last packet identifier of the signaling message sent on link B, is derived by the receiver of the message with a certain accuracy as selected from one or more of the following: (a) the expected transmission frequency/periodicity of the signaling message; (b) the starting value of a packet identifier and a starting time; and (c) the elapsed number of periods based on the expected transmission frequency from the starting time; and (vii) wherein the non-AP MLD identifies the expected last packet identifier of a signaling message on link B, and the replay counter for the signaling message is updated by the expected last packet identifier; wherein the non-AP MLD uses the updated replay counter to determine the validity of the signaling message received on link B.

\* \* \* \* \*